3,176,959
TURBINE CONTROL SYSTEM FOR MAINTAINING CONSTANT OUTPUT TORQUE
Francis Richard Ellenberger, Marblehead, Mass., assignor to General Electric Company, a corporation of New York
Filed June 27, 1963, Ser. No. 291,149
9 Claims. (Cl. 253—59)

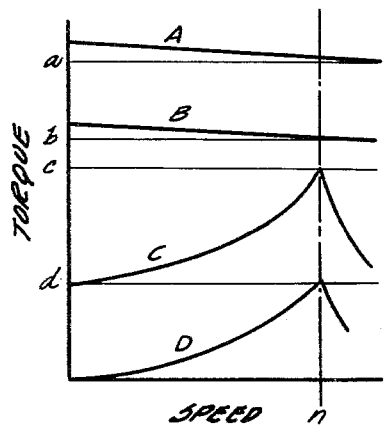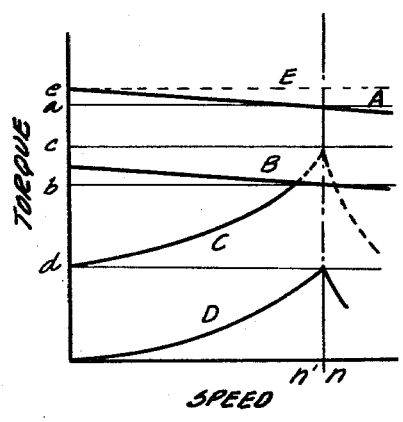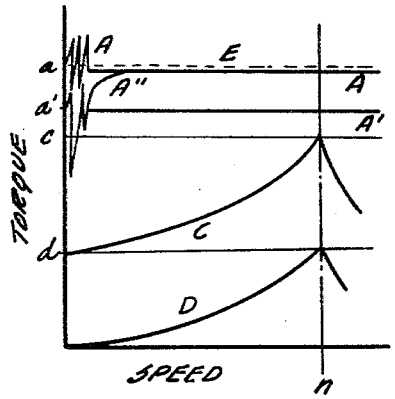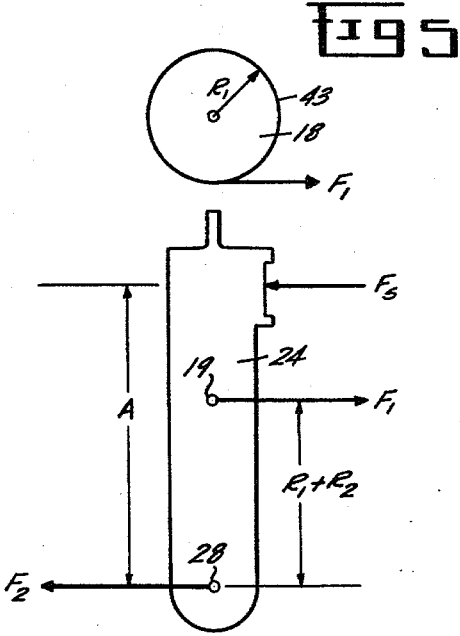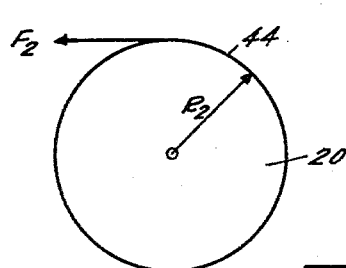

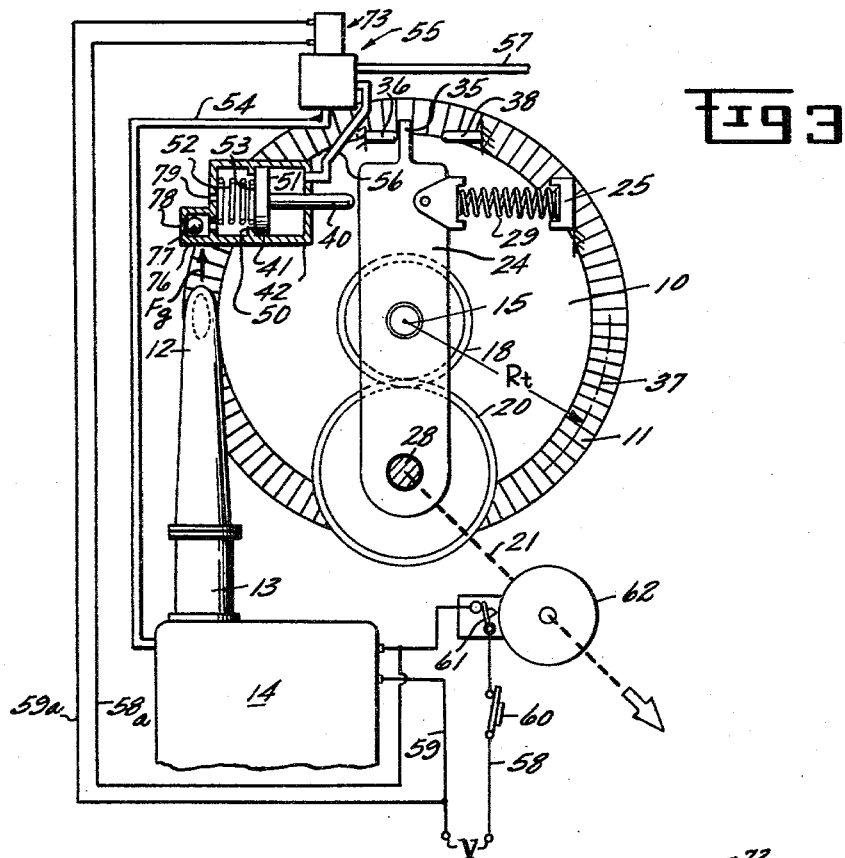

This invention relates to control systems for fluid turbines and, more particularly, to improved control systems for gas turbine starters. This invention is especially suited for use in situations in which design requirements severely limit the maximum output torque which can be developed by the starter.

A gas turbine starter is a relatively small gas turbine unit powered by a source of gas or other motive fluid under pressure for bringing the rotor of a large gas turbine engine up to self-sustaining speed. In this type of application, the starter output shaft is mechanically connected to the engine gearbox through which it transmits its torque to the engine rotor. It will be appreciated that the starter output torque must not exceed the maximum torque level for which the gearbox is designed. In practice, it has been found that certain gas turbine engines, particularly aircraft engines where minimum weight is a prime design criterion, have gearbox torque limits which are relatively low. In fact, the maximum allowable gearbox torque may be only slightly greater than the maximum engine drag torque at the gearbox.

It will be appreciated also that the torque required to turn the rotor of the driven gas turbine engine varies over a relatively wide range with engine speed. For example, this drag torque at the beginning of the start cycle consists primarily of friction. As the speed increases, however, the rotating losses of the engine, primarily windage, increase substantially, the drag torque therefore reaching a maximum just as the engine rotor reaches its firing speed.

The drag torque is also affected by the ambient temperature. At any given engine speed, the load imposed on the starter at −65° F. is substantially greater than the load imposed at +160° F., these temperatures representing roughly the range of operating temperatures for which equipment of this type must be designed. In other words, engine drag torque varies widely with both engine speed and environmental conditions. It thus becomes obvious that maximum drag torque occurs during low temperature starting just as the engine reaches its firing speed. As pointed out previously, this maximum engine drag torque is in some engines only slightly lower than the maximum allowable gearbox torque.

It is a common practice to supply the pressurized gas required to drive the starter from a high pressure source such as a propellant cartridge. The propellants used in these cartridges are characterized by a temperature sensitivity which causes the burn rate, and therefore the rate at which energy is released, to increase with increasing ambient temperature. This characteristic is further aggravated by the fact that the higher burn rate results in a higher pressure within the breech containing the propellant, and this pressure increase has the effect of increasing the burn rate still further. In fact, for some propellants, the burn rate at +160° F. is as much as twice the burn rate at −65° F.

A conventional fixed wheel starter has turbine buckets which are at all times fully immersed in the motive fluid stream. The output torque from such a starter varies widely with ambient temperature since the input torque imposed on the starter turbine wheel by the fluid stream varies directly with the propellant burn rate. In other words, the maximum starter output torque occurs at the highest propellant burn rate. Since the engine gearbox torque limit must not be exceeded, this means that the starter system must be designed and its elements must be selected such that the starter output torque at the maximum design temperature does not exceed the maximum allowable gearbox torque. At lower ambient temperatures, the starter output torque is substantially reduced in response to the reduced propellant burn rate, the result being that the output torque at lower ambient temperatures is less than the maximum allowable gearbox torque. As pointed out previously, the maximum engine drag torque occurs during low temperature starting just as the engine reaches firing speed. In view of the fact that the maximum engine drag torque in some engines is only slightly lower than the maximum allowable gearbox torque, the net torque available for acceleration at lower ambient temperatures may thus be insufficient for satisfactory operation. In fact, an engine which develops more than normal drag torque, or an engine which has a firing speed higher than normal (which causes the drag to continue to rise), can reduce the net torque available so much that a successful start cannot be made.

It is thus apparent that an ideal cartridge type starter for such an engine would develop the maximum allowable output torque when it is most needed, i.e., at low ambient temperatures. This can be accomplished by designing the starter system and by selecting its elements such that the starter output torque at the minimum design temperature is equal to the maximum allowable gearbox torque. Means must be provided in such a system for preventing the output torque at higher ambient temperatures from exceeding the gearbox torque limit. In the past, these means have taken the form of either flow regulating valves for progressively throttling the flow of motive fluid to the starter turbine wheel or pressure regulating valves for minimizing the increase in the burning pressure of the cartridge with progressively higher ambient temperatures. In either case, the valves must control the flow of erosive gas under high temperature and high pressure conditions. The problems relating to accuracy of control, endurance, and reliability in these regulating means are quite substantial; accordingly, it has been found in practice that these devices are not entirely satisfactory.

Another consideration which enters into the design of high pressure starters is the problem of high initial torques connected with the initiation of the start cycle. These can occur, for example, from ignition pressure peaks which occur on the firing of the propellant. In conventional starters, where these initial torque peaks are commonly about 15% greater than normal torque, it is necessary to design the control system such that gearbox torque limit is not exceeded by the initial torque. As a result, the normal torque exerted on the turbine wheel during the remainder of the start cycle is generally well below the maximum allowable output torque. A suitable control means for limiting the magnitude of the impact torque is described and claimed in a co-pending application entitled, Control System for Fluid Turbines, Serial No. 289,511, filed in the names of F. R. Ellenberger and R. A. Carter, and assigned to the assignee of this invention. The control means described in the above application limits the rate at which a movable turbine wheel can move into the motive fluid stream at the beginning of the start cycle by means of a locking member which is slowly withdrawn from engagement with wheel's supporting structure.

The above discussion has been concerned primarily with factors which affect the probability of achieving successful starts. Consideration must also be given to the effect of a no-load firing. A "no-load firing" occurs where the starter output shaft is not connected to a load when the propellant is ignited. No-load firings can result, for example, from improper installation or from failure of either the starter shaft or the engine gearbox shaft. Since the cartridge, when once ignited, will continue to burn until completely expended, and since the movement of inertia of the starter turbine wheel is relatively low, it is obvious that a no-load firing can result in rapid acceleration of the starter turbine to its failure speed. Devices used in the past for preventing the attainment of failure speed have included auxiliary driven means such as compressors connected to the starter which fully absorb the available energy at a speed below the failure speed. These devices are not entirely satisfactory, however, since they also dissipate useful energy during normal starts and add substantially to the weight of the starter.

It is therefore a primary object of this invention to provide an improved control system for fluid turbines which is capable of limiting the maximum output torque produced by the turbine.

It is another object of this invention to provide an improved control system for cartridge type starters which schedules substantially constant starter output torque throughout the start cycle at all operating temperatures.

It is a further object of this invention to provide overspeed protection in the event of a no-load firing.

It is a still further object to provide overspeed protection for fluid turbines without dissipating useful energy during normal starts and without adding substantially to the weight of the starter.

A still further object of this invention is to provide a control system which provides the above objects and is relatively simple in construction and reliable in operation.

Briefly stated, in accordance with the illustrated embodiments of the invention, the above and other objects are accomplished by rotatably mounting the turbine wheel of the starter on a pivotally mounted yoke which may be pivoted to move the wheel into and out of the motive fluid stream, and by providing means for controlling the degree of immersion as a function of a reference force applied on the yoke such that a desired output torque is provided throughout the start cycle at all operating temperatures. More particularly, the load reaction forces are exerted on the yoke such that the net effect on the yoke is proportional to the actual output torque and in a direction to move the wheel out of the fluid stream. A reference force is applied on the yoke in a direction to move the wheel into the fluid stream, the net effect of the reference force being proportional to a desired net output torque. As a result, the yoke moves to an equilibrium position in which the actual output torque is equal to the desired torque. By applying a constant reference force, a constant output torque is scheduled under all normal operating conditions. In addition, means are provided for moving the wheel out of the fluid stream in the event that an overspeed condition is reached.

The novel features of this invention are set forth with particularly in the appended claims. The invention, however, both as to its organization and method of operation, together with further objects and advantages thereof, may best be understood by reference to the following description taken in connection with the accompanying drawings in which:

FIG. 1 is a graphical illustration of variations of starter output torque and engine drag torque with ambient temperature for a typical fixed wheel starter arrangement; and FIG. 2 is a graphical illustration similar to FIG. 1 for a fixed wheel starter installation in which the allowable engine gearbox torque is severely limited; and FIG. 3 is a schematic presentation of the turbine wheel and gearing arrangement of a gas turbine starter embodying the invention, and FIG. 4 is a side view of the arrangement of FIG. 3; and FIGS. 5 and 6 are force diagrams showing the force exerted on the gears of the system illustrated in FIG. 3; and FIG. 7 is a force diagram showing the forces exerted on the pivotally mounted yoke on which the turbine wheel is mounted in the starter arangement of FIG. 3; and FIG. 8 is an enlarged detailed view of a portion of the arrangement of FIG. 3; and FIG. 9 is a graphical illustration similar to FIGS. 1 and 2 showing starter output torque and variations in engine drag torque with ambient temperature for the starter arrangement shown by FIG. 3.

Referring first to FIG. 1 in which the variations of starter output torque and engine drag torque with ambient temperature for a typical fixed wheel starter arrangement are illustrated, line A represents the output torque developed at the maximum ambient temperature and line B represents the output torque developed at the minimum ambient temperature. As indicated previously, these temperatures are typically +160° F. and −65° F., respectively. The difference in the output torque developed at these extreme design temperatures is due to the difference in the propellant burn rate. The slight reduction, or "droop," of output torque with speed at each of the ambient temperature extremes is caused by the reduction in relative velocity between the motive fluid stream and the turbine wheel periphery with increasing speed and by increasing windage losses, and other losses in the fixed wheel starter itself with increasing speed. Lines C and D represent the drag torque of the driven engine during starting at the minimum and maximum design temperatures, respectively. As shown, the engine drag torque at any given engine speed is substantially greater at the minimum ambient temperature than at the maximum temperature.

Still referring to FIG. 1, the vertical distance between lines A and D at any given speed represents the torque available at the maximum design temperature for accelerating the engine when the rotor is turning at that speed. For example, torque represented by distance $ad$ is available for accelerating the engine at its self-sustaining speed, $n$. At the minimum design temperature, the accelerating torque available at the firing speed is represented by distance $bc$. For simplicity, it has been assumed that the firing speeds at the extreme temperatures are identical. Even under the most adverse conditions experienced at the minimum ambient temperature, it is probable that a successful start can be accomplished since accelerating torque, although small, is always available.

Certain gas turbine engines, particularly those used in aircraft installations, have gearboxes designed to transmit relatively low levels of torque. This in turn places a maximum limit on the allowable starter output torque. Suppose, for example, that a fixed wheel starter system thus has a maximum gearbox torque limit as illustrated by line E of FIG. 2. The starter system must therefore be designed such that the output torque developed at the maximum ambient temperature does not exceed the torque limit at any speed. With line A thus lowered to the position illustrated, line B representing output torque of the conventional fixed wheel starter at the minimum ambient temperature is correspondingly reduced. Again, sufficient torque, represented by distance $ad$ is available for accelerating the engine at the maximum ambient temperature. However, under adverse conditions, there may not be sufficient torque for accelerating the engine when starting at the minimum temperature. In the example illustrated by FIG. 2, lines B and C intersect at a speed $n'$ which is lower than the firing speed $n$. Since no accelerating torque is available at the speed $n'$, the starter cannot accelerate the engine up to and beyond its firing speed and, consequently, a sucessful start cannot be accomplished.

Turning now to FIGS. 3 and 4, a starter control system embodying this invention is illustrated, the starter thereby overcoming the difficulties discussed above. The starter includes a gas turbine wheel 10 having positioned around its periphery a set of buckets 11 adapted to receive a stream of high pressure motive fluid from a nozzle 12, the nozzle being connected by a supply conduit 13 to a breech 14. The turbine wheel 10 is secured to a shaft 15 mounted for rotation in a pair of bearings 16 and 17. Mounted on the shaft 15 intermediate the two bearings 16 and 17 is an output pinion 18. The output pinion 18 meshes with an output gear 20 which forms part of the output gear train of the starter, the gear train being indicated generally by the dotted line 21 in FIG. 3. The output gear 20 is mounted for rotation in a pair of bearings 22 and 23. In other words, the output torque is transmitted from the turbine output pinion 18 to the output gear 20 and thence to the load through the remainder of the output gear train 21.

The bearings 16, 17, 22 and 23 are mounted in a yoke member 24 which is, in turn, pivotally mounted in the turbine casing 25 on a pair of bearings 26 and 27. The center line of pivotal movement of the yoke 24 as established by the bearings 26 and 27 is concentric with the center of rotation 28 of the output gear as established by the bearings 22 and 23. Thus the entire assembly of the rotatably mounted turbine wheel 10, the pinion gear 18, and the output gear 20 may be pivoted around the center of rotation 28 of the output gear 20. Movement of the yoke 24 in the clockwise direction about its pivot point as viewed in FIG. 3 is opposed by a spring 29 which bears against the turbine casing 25 as shown.

With the arrangement described thus far, it will be observed that the yoke 24 may be pivoted back and forth on the bearings 26 and 27 to vary the degree of immersion of the buckets 11 on the turbine wheel in the motive fluid or gas stream flowing from the nozzle 12. The yoke 24 is provided with a tang 35 which bears against a stop 36 at the position of maximum immersion of the buckets 11 in the gas stream, a position corresponding to the alignment of the bucket pitch line 37 with the directional center of the nozzle 12 such that the center of the gas stream impinges on the buckets approximately at the pitch line. The position of maximum immersion is illustrated in FIG. 3. The yoke 24 can be pivoted in the clockwise direction until the tang 35 engages a stop 38 at the position of minimum immersion of the buckets 11 in the gas stream.

A locking member 40 connected to a piston 41 reciprocably mounted in a cylinder 42 will also be noted in FIG. 3. Its function and mode of operation will be discussed in detail at a later point in this description. Suffice it to say here that the yoke 23 and the turbine wheel 10 are free to move in the manner described above when the locking member 40 and piston 41 are positioned as shown in FIG. 3. The positions illustrated are the normal positions when the nozzle 12 is supplying a stream of hot gas.

Before proceeding with an explanation of the operation of the starter during the start cycle, it will be helpful to present an analysis of the forces imposed on the turbine wheel and on the various other elements described thus far.

Considering the turbine wheel first of all, it will be appreciated that the gas stream generates a force on the turbine wheel 10, identified as F g FIG. 3, which for all practical purposes may be assumed to be in a direction tangent to the bucket pitch line 37. In other words, the force generated by the gas on the buckets, although in fact distributed over a sector of buckets, may for the purposes of analysis be assumed to be a single force F g acting at the center of impingement in a direction tangent to the bucket pitch line 37. It should be noted that the particular direction is vertical; the significance of this direction will soon be apparent. The radius from the center of rotation of the turbine wheel to the bucket pitch line is identified by the symbol $R_t$.

Referring now to FIG. 5, a force diagram for the turbine pinion 18 is shown. Assuming a clockwise direction of rotation of the turbine wheel as viewed in FIG. 3, a reaction force $F_1$ will be imposed on the pinion 18 at the point of mesh with the output gear 20. In the arrangement shown, the centers of rotation of the gears 18 and 20, and hence their point of mesh, lie along a vertical line passing through the centers of rotation. The force $F_1$ is thus in the horizontal direction and tangent to the pitch line 43 of the pinion 18, which is at a radius $R_1$ from the center of rotation of the pinion.

A force diagram for the output gear 20 is shown by FIG. 6. A single force $F_2$ is imposed on the output gear 20 at the point of mesh with the pinion 18. The force $F_2$ is horizontally directed tangent to the pitch line 44 at a radius $R_2$ from the center of rotation of the gear.

The resultant forces imposed on the yoke 24 will now be examined. The forces on the gears 18 and 20 can be transmitted to the yoke 24 only through the bearings in which these gears are mounted and, assuming frictionless bearings, will be imposed through the centers of rotation of the bearings. For example, the force $F_1$ on the pinion 18 can be imposed on the yoke 24 only through the reaction of the bearings 16 and 17 on the yoke. Because the bearings may be assumed to be frictionless for the purpose of analysis without introducing any significant error into the analysis, this force is generated through the center of rotation 19 of the bearings 16 and 17 as shown in FIG. 7 and is equal and parallel to the force $F_1$ on the pinion 18 as viewed in FIG. 5. The center of rotation 19 of the bearings 16 and 17 is located at a moment arm distance $R_1+R_2$ from the pivotal center 28 of the yoke.

Similarly, the horizontally directed force $F_2$ imposed on the output gear 20 will be directed through the center of rotation 28 of the yoke and will thus produce no moment on the yoke about its center of rotation. The spring 29 exerts a force $F_s$ on the yoke 24 at a moment arm distance A from the center of rotation 27 of the yoke. Since the gas force $F_g$ is vertically directed, it produces no turning moment on the yoke 23, but is vertically directed through the center of rotation 19.

Referring now to the force diagrams of FIGS. 5, 6, and 7, and keeping in mind the fact that the force exerted by each of the gears on its meshing gear is equal to the reaction force exerted by that gear, the following relationship may be set out:

(1) $$F_1 = F_2$$

Now, summing the moments on the yoke 24 about its pivotal center 28 and specifying the conditions for static equilibrium, the following equation is formed:

(2) $$F_s A - F_1(R_1 + R_2) = 0$$

or (3) $$F_1 = \frac{F_s A}{R_1 + R_2}$$

Multiplying both sides of Equation 3 by $R^1$, the pitch radius of the pinion gear 18, and $G_r$, the gear ratio of the starter between the turbine and the output shaft, yields:

(4) $$F_1 R_1 G_r = F_s \left[ \frac{A R_1 G_r}{R_1 + R_2} \right]$$

Recognizing that the term $F_1 R_1 G_r$ represents the output torque of the starter, and that the term $A R_1 G_r / R_1 + R_2$ is a constant, it will be obvious that the output torque varies as a direct function of the spring force $F_s$. Therefore, it will be appreciated that the output torque is constant where the spring force $F_s$ is constant.

The above analysis assumed a condition of static equilibrium. It will now be shown that, where the yoke 24 is subjected to an unbalanced force system, the yoke 24 will move to an equilibrium position in which the output torque is specified by the magnitude of the spring force $F_s$.

Considering first of all the torque producing forces on the turbine wheel 10 and the pinion 18, the gas force exerts a torque on the wheel equal to the magnitude of $F_g$ multiplied by the radius $R_t$, and the reaction torque in the opposite direction is equal to the pinion reaction force $F_1$ multiplied by the radius $R_1$. The difference between these two torques is the net torque on the turbine wheel which is available for accelerating the wheel and for supplying wheel losses such as windage and friction. From the foregoing, the following relationship can be stated:

(5) $\qquad I_t\alpha_t = F_g R_t - F_1 R_1 - T_L$

In Equation 5, $I_t$ is the polar moment of inertia of the turbine wheel, $\alpha_t$ is the angular acceleration of the wheel, and $T_L$ is the torque consumed by the wheel losses.

The output torque similarly is comprised of several components. A portion of the output torque is consumed by the driven engine's drag torque. The difference between the output torque and the drag torque is the net torque available for accelerating the engine. From the foregoing, the following relationship can be stated:

(6) $\qquad F_1 R_1 G_r = T_d + I_e \dfrac{\alpha_t}{G_r}$

In Equation 6, $I_e$ is the polar moment of inertia of the engine, $T_d$ is the drag torque, and $G_r$ is the gear ratio of the starter.

Suppose that the torque, $F_g R_t$, exerted on the turbine wheel 10 by the gas stream is decreased for some reason such as, for example, in response to a decrease in ambient temperature. In such an event, $I_t\alpha_t$ in Equation 5 is decreased, which will cause $$I_e \dfrac{\alpha_t}{G_r}$$

in Equation 6 to decrease since the engine and the starter are directly coupled. As a result, $F_1$ in Equation 6 will also be decreased. With $F_1$ decreased, the constant spring Force $F_s$ will move the wheel further into the gas stream until the torque exerted on the turbine wheel by the gas stream returns to its original value and Equation 2 again specifies an equilibrium condition.

As another example, suppose that the engine drag torque $T_d$ increases as a function of speed or temperature or for any other reason. Then, the equal forces $F_1$ and $F_2$ will increase to balance Equation 6 for the moment. The increase in $F_1$ will unbalance the yoke and cause the wheel to move out of the fluid stream. This causes $F_g R_t$ to decrease in Equation 5 which, in turn, results in a decrease in $I_t\alpha_t$. Since the engine and the starter are directly coupled, the decrease in $I_t\alpha_t$ causes a corresponding reduction in $$I_e \dfrac{\alpha_t}{G_r}$$

of Equation 6. The end result is that $F_1$ in Equation 6 then decreases to its original value to balance the new engine drag torque, $T_d$.

The above discussion shows that the output torque of the starter arrangement of FIG. 3 is constant in the event that a constant spring force $F_s$ is exerted on the yoke 23. Returning now to FIG. 3, the remainder of the starter arrangement will be described, after which the operation of the starter during the entire start cycle will be discussed in detail.

As stated previously, the normal position of the locking member 40 during the period when a high pressure stream of motive fluid is being supplied by the nozzle 12 is the retracted position shown by FIG. 3. The piston 41 is held against stops 50 by the high pressure within the breech acting on face 51 of the piston through means which will be described presently, the pressure force being sufficient to overcome the biasing force of a compression spring 52 acting on the other face 53 of the piston. When high pressure fluid is not acting on the piston 41, the spring 52 forces the piston 41 and the locking member 40 to the right to an extended position. As the locking member 40 moves to the right, it engages the yoke 24 and rotates it about its pivotal center 28 until the tang 35 engages the stop 38 and the wheel 10 is in its minimum immersion position. The force exerted by the spring 52 is sufficient to overcome fully the force of the spring 29 to lock the tang 35 against the stop 38.

A fluid conduit 54 connects the breech 14 to a solenoid valve 55, and a second conduit 56 connects the valve 55 to the cylinder 42. A third conduit 57 provides an atmospheric dump from the valve. A voltage source V is connected to the breech 14 and the valve 55 by electric leads 58, 58a, 59, and 59a. Switches 60 and 61 are provided in the electric lead 58, the switch 60 being manually operated and the switch 61 being operated by a speed responsive device 62 forming a part of the output gear train 21. The switch 61 is closed when the starter speed is below a preselected level and open when the speed is above the preselected level.

Referring now to FIG. 8, a suitable form of the valve 55 is shown in detail. A cylinder 65 is divided internally into three compartments 66, 67, and 68. Conduit 54 is connected to the first compartment 66, conduit 56 to the second compartment 67, and conduit 57 to the third compartment 68. Valve seats 69 and 70 are provided between the three compartments, and a piston 71 is movable between first and second seating positions with both valve seats. The piston 71 is connected to the core 72 of a solenoid 73 for movement therewith. When the coil 74 of the solenoid 73 is energized from electric leads 58a and 59a, the core 72 and piston 71 are in the first positions illustrated with the piston 71 contacting valve seat 69. In the event that the solenoid is de-energized, the piston 71 is moved into its second position in which it contacts the valve seat 70, thereby venting compartment 67 to atmosphere through the compartment 68 and the conduit 57.

The operation of the illustrated control system will now be described. Prior to the initiation of the start cycle, the switch 60 is open, the switch 61 is closed, and the spring 52 maintains the yoke 24 in a locked position with the tang 35 engaging the stop 38. The start cycle is initiated by closing switch 60 manually, which completes the appropriate circuits, thereby electrically igniting the propellant in the breech 14 and energizing the solenoid. The breech pressure is communicated to the cylinder 42 through conduits 54 and 56 through the valve compartments 66 and 67 to withdraw the locking member 40 and thereby permit the wheel to be moved into and out of the gas stream supplied by the nozzle 12. With the force $F_s$ exerted by the spring 29 held constant, a constant output torque is obtained as described above.

With the characteristics, including the maximum allowable gearbox torque, of the starter and the driven engine known, the spring 29 can be selected and adjusted such that a constant output torque just slightly less than the allowable gearbox torque is maintained. The constant output torque in such a situation is represented by line A of FIG. 9, lines C and D having significance similar to those of FIGS. 1 and 2. Unfortunately, as pointed out previously, pressure peaks may occur on initial firing of the propellant charge. If the turbine buckets 11 are allowed to move into the high pressure gas stream too rapidly, excessive torque peaks may be developed on the turbine wheel 10. This situation is illustrated by line A of FIG. 9 in which the initial output torque exceeds the maximum allowable gearbox torque. One solution to this problem would be to select the spring 28 such that the initial torque would not be excessive. Such a choice would result in a steady state constant output torque represented by line A′. Here, the output torque is substantially below the maximum allowable gearbox torque and, under adverse conditions, may prove to be inadequate to accelerate the driven engine to its self-sustaining speed.

Alternatively, the spring 29 can be selected to provide the steady state output torque represented by line A, provided that additional time delay means are utilized to delay substantial movement of the wheel 10 into the gas stream until after the initial transients have subsided. It may also be desirable to limit the rate at which the wheel can move into the fluid stream. To provide this function, the cylinder 42 has a ball check valve 76 comprising a ball 77 and an orifice 78. A second orifice 79 having a relatively small flow area is also provided in the cylinder 42. The valve 76 and the orifice 79 cooperate to limit the rate at which the locking member 40 is withdrawn from engagement with the yoke 24. When the propellant charge is ignited, the breech pressure increases rapidly and exerts a force on the face of the piston 41 as the piston 41 moves to the left as viewed in FIG. 3, the ball 77 seats to close off orifice 78 and prevent escape of air therethrough. The air within the orifice 42 can only escape through the orifice 79 which is sized so as to allow the locking member 40 to be withdrawn from engagement with the yoke 24 at the desired rate. Following the start cycle, the compression spring 52 again forces the piston 41 to the right and the locking member 40 into engagement with the yoke 24 to move the tang 35 into engagement with the stop member 38 and lock the wheel 10 in its minimum immersion position. Another way to limit the rate at which the wheel 10 can move into the fluid stream would be to provide a flow orifice (not shown) in the conduit 56 to limit the rate at which the pressure in the cylinder 42, and hence the magnitude of the force supplied on the face 51 of the piston 41 can build up.

Assume now that the switch 60 is closed at an instant when the output gear train 21 is not connected to a load or that the load is somehow disconnected from the starter during the start cycle. In such an event, there would be no load reaction force $F_1$ tending to move the wheel 10 out of the gas stream. As a result, force $F_s$ of the spring 29 would maintain the wheel in the gas stream, and there would be a possibility of accelerating the wheel 10 to its failure speed. According to this invention, the speed responsive means 62 opens the switch 61 at the moment that a preselected speed below the failure speed is attained. This breaks the electric circuit to both the breech 14 and the solenoid valve 55. The propellant will, of course, continue to burn until it is fully expended. When, however, the solenoid is de-energized, the solenoid core 72 moves downwardly as viewed in FIG. 8 and moves the valve piston 71 into contact with the valve seat 70. As a result, the cylinder 42 is vented to atmosphere through the conduit 57. With the breech pressure no longer acting on the face 51 of the piston 41, the spring 52 rapidly forces the piston 41 to the right to move the wheel 10 out of the fluid stream to the minimum immersion position in which the gas force $F_g$ is insufficient to accelerate the wheel 10 to its failure speed. At the same time, the ball 77 moves out of sealing engagement with the orifice 78 and allows atmospheric air to flow into the cylinder 42 and prevents the creation of a vacuum which would retard the rate of movement of the piston 41 and the locking member 40.

A number of modifications will be obvious to those skilled in the art. For example, the yoke supporting the turbine wheel could be mounted horizontally and the gas stream could be supplied to the wheel in a horizontal direction. In such a case, the weight of the various starter elements would impose a torque on the yoke. A constant torque output can still be scheduled under these conditions since the weight imposes substantially constant torque to the yoke acting in a known direction. The present invention has been primarily concerned with providing a constant output torque. By selecting the spring 29 with a suitable spring gradient, it will be obvious that output torques having other than constant magnitude may be scheduled if desired.

It will thus be seen that this invention provides an improved control system for cartridge type gas turbine starters which is capable of scheduling substantially constant output torque, the constant torque being independent of the ambient temperature. In addition, the invention provides overspeed protection for the starter without dissipating useful energy during normal starts and without adding substantially to the weight of the starter.

While preferred embodiments of this invention have been described, it will be obvious to those skilled in the art that various changes and modifications may be made without departing from the invention, and it is therefore intended to cover in the appended claims all such changes and modifications as fall within the true spirit and scope of the invention.

What is claimed as new and desired to secure by Letters Patent of the United States is:

1. Means for controlling the output torque of a turbine wheel driven by a stream of motive fluid, said control means comprising:
   (a) movable mounting means rotatably supporting said wheel,
   (b) said mounting means adapted to move the wheel periphery into and out of the motive fluid stream and thereby vary the magnitude of the torque imposed on the wheel by the motive fluid stream,
   (c) means connecting the wheel to a load,
   (d) means transmitting the forces imposed on said connecting means by the load to said mounting means such that the net effect of the load on the mounting means is proportional to the actual output torque of said turbine wheel and in a direction to move said wheel to decrease the magnitude of the torque imposed on said wheel by the fluid stream.
   (e) and means imposing a reference force on said movable mounting means such that the net effect of the reference force on the mounting means is proportional to a desired output torque of said wheel and in a direction to move said wheel to increase the magnitude of the torque imposed on said wheel by the fluid stream, said mounting means being positioned solely by the net effect thereon of the load and the reference force,
   (f) whereby the mounting means is moved to an equilibrium position in which the actual output torque of said wheel is equal to the output torque specified by the reference force.

2. Apparatus as set forth in claim 1 in which means is provided for imposing a constant reference force proportional to a desired constant output torque on said movable mounting means.

3. Means for controlling the output torque of an axial flow turbine wheel driven by a stream of motive fluid impinging against buckets peripherally mounted on said wheel, said control means comprising:
   (a) a movably mounted yoke rotatably supporting said wheel,
   (b) said yoke adapted to move in response to forces imposed thereon to move the wheel periphery into and out of the motive fluid stream and thereby vary the magnitude of the torque imposed on the wheel by the motive fluid stream,
   (c) gearing means mounted in said yoke,
   (d) means connecting said wheel to the load through said gearing means,
   (e) means transmitting the forces imposed on said connecting means by the load to said yoke such that the net effect of the load on said yoke is a moment proportional to the actual output torque of said turbine wheel and in a direction to move the wheel periphery out of the motive fluid stream,
   (f) and means imposing a constant reference force on said yoke such that a net moment proportional to a desired output torque is imposed on said yoke in a direction to move the wheel periphery into the motive fluid stream, said yoke being positioned solely by the net effect thereon of the load and the reference force, (g) whereby said yoke is moved to an equilibrium position in which the actual output torque of said wheel is equal to the constant output torque specified by the reference force.

4. Means for controlling the output torque of an axial flow turbine wheel driven by a stream of motive fluid impinging against buckets peripherally mounted on said wheel, said control means comprising:
(a) a pivotally mounted yoke rotatably supporting said wheel,
(b) said yoke adapted to move angularly in a plane parallel with the plane of rotation of said wheel to move the wheel periphery into and out of the motive fluid stream and thereby vary the magnitude of the torque imposed on the wheel by the motive fluid stream,
(c) output gearing means in said yoke,
(d) means connecting said wheel to the load through said output gearing means,
(e) means transmitting the forces imposed on said connecting means by the load to said yoke such that a net moment proportional to the actual output torque of the wheel is imposed on the yoke in a direction to move the wheel peripherally out of the motive fluid stream,
(f) and means imposing a constant reference force proportional to a desired output torque on said yoke such that a net moment proportional to a desired output torque is imposed on said yoke in a direction to move the wheel peripherally into the motive fluid stream, said yoke being positioned solely by the net effect thereon of the load and the reference force,
(g) whereby the yoke is moved to an equilibrium position in which the actual output torque of said wheel is equal to the constant output torque experienced by the reference force.

5. A fluid turbine control arrangement comprising:
(a) an axial flow turbine wheel having a row of turbine buckets peripherally mounted thereon,
(b) supply means adapted to supply a stream of motive fluid,
(c) movable mounting means rotatably supporting said turbine wheel and adapted to move the turbine buckets into and out of the motive fluid stream and thereby vary the magnitude of the torque imposed on the wheel by the motive fluid stream.
(d) said wheel being movable between a first end position in which the fluid stream exerts maximum torque on said wheel and a second end position in which the fluid stream exerts minimum torque on said wheel,
(e) means connecting the wheel to a load,
(f) means transmitting the forces imposed on said connecting means by the load to said mounting means such that the net effect of the load on the mounting means is proportional to the actual output torque of said turbine wheel and in a direction to move said wheel toward said second end position,
(g) means imposing a reference force on said movable mounting means such that the net effect of the reference force on the mounting means is proportional to a desired output torque of said turbine wheel and in a direction to move said wheel toward said first end position,
(h) whereby the mounting means is moved to an equilibrium position in which the actual output torque of said wheel is equal to the output torque specified by the reference force,
(i) and means responsive to the speed of said turbine wheel overriding said reference force transmitting means when a preselected speed is attained and moving said turbine wheel to said second end position so as to reduce the magnitude of the torque imposed on the wheel by the motive fluid stream.

6. Apparatus as set forth in claim 5 in which means is provided for imposing a constant reference force proportional to a desired constant output torque on said movable mounting means.

7. A fluid turbine control arrangement comprising:
(a) an axial flow turbine wheel having a row of turbine buckets peripherally mounted thereon,
(b) supply means adapted to supply a stream of motive fluid,
(c) a pivotally mounted yoke rotatably supporting said wheel and adapted to move angularly in a plane parallel with the plane of rotation of said wheel so as to move the turbine buckets into and out of the motive fluid stream and thereby vary the magnitude of the torque imposed on the wheel by the motive fluid stream,
(d) said wheel being movable between a first end position in which the fluid stream exerts maximum torque on said wheel and a second end position in which the fluid stream exerts minimum torque on said wheel,
(e) output gearing means in said yoke,
(f) means connecting said wheel to a load through said output gearing means,
(g) means transmitting the force imposed on said connecting means by the load to said yoke such that a net moment proportional to the actual output torque of the wheel is imposed on the yoke in a direction to move said wheel toward said second end position,
(h) means imposing a constant reference force proportional to a desired output torque on said yoke such that a net moment proportional to a desired output torque is imposed on said yoke in a direction to move said wheel toward said first end position,
(i) whereby the yoke is moved to an equilibrium position in which the actual output torque of said wheel is equal to the output torque specified by the reference force,
(j) and means responsive to the speed of said turbine wheel overriding said reference force transmitting means when a preselected speed is attained and moving said turbine wheel to said second end position so as to reduce the magnitude of the torque imposed on the wheel by the motive fluid stream.

8. A fluid turbine control arrangement as defined by claim 7 in which said speed responsive override means comprises:
(a) a cylinder,
(b) a piston reciprocally mounted in said cylinder,
(c) locking means connected to said piston for movement therewith between an extended position and a retracted position,
(d) said locking means engaging said movable mounting means in said extended position to lock said turbine wheel in said second end position and said locking means removed from engagement with said movable mounting means in said retracted position so as to permit movement of said turbine wheel through said range of positions,
(e) means imposing a reference force on said piston in a direction to move said locking means to said extended position,
(f) valve means movable between first and second operative positions,
(g) fluid communication means connecting said supply and said cylinder through said valve means when said valve means is in said first operative position and connecting said supply and atmosphere through said valve means when said valve means is in said second operative position,
(h) the total force exerted on said piston by the pressure of a stream of motive fluid being supplied by said supply means when said valve means is in said first operative position being oppositely directed and sufficient to overcome said reference force and move said locking means to said retracted position, thereby permitting movement of said turbine wheel through said range of positions, (i) electric circuit means including a normally closed switch connected to said valve means for controlling the position of said valve means, said valve means being in said first operative position when said circuit means is energized and in said second operative position when said circuit means is de-energized, (j) and means responsive to the speed of said turbine wheel for opening said switch and thereby de-energizing said circuit when the speed of said wheel reaches a pre-selected level, (k) whereby the supply means is connected to atmosphere and the means imposing a reference force on said piston moves said locking means to its extended position to thereby lock said turbine wheel in said second end position.

9. A fluid turbine control arrangement as defined by claim 8 in which check valve means is provided for limiting the rate at which the pressure of a stream of motive fluid moves the locking means from said extended position to said retracted position.

References Cited by the Examiner

UNITED STATES PATENTS

| | | | |
|---|---|---|---|
| 2,609,661 | 9/52 | Nardone | 253—59 |
| 2,614,798 | 10/52 | Rubbra | 253—59 |
| 2,685,428 | 8/54 | Tressl | 253—59 |
| 2,689,707 | 9/54 | Graham | 253—59 |
| 3,094,311 | 6/63 | Goldstein | 253—59 |
| 3,107,896 | 10/63 | Dantowitz | 253—59 |

FOREIGN PATENTS 1,074,095  3/54  France.

SAMUEL LEVINE, *Primary Examiner.*